United States Patent [19]

Carbonaro

[11] 4,367,183
[45] Jan. 4, 1983

[54] AIR CHANNELING DEVICE FOR MIXING DRY AND HUMID AIR STREAMS OF A COMBINED WET AND DRY ATMOSPHERIC COOLER

[75] Inventor: Mario G. B. Carbonaro, Brussels, Belgium

[73] Assignee: Hamon-Sobelco, S.A., Brussels, Belgium

[21] Appl. No.: 275,130

[22] Filed: Jun. 18, 1981

Related U.S. Application Data

[63] Continuation of Ser. No. 133,669, Apr. 25, 1980, abandoned.

[51] Int. Cl.³ .............................................. B01F 3/04
[52] U.S. Cl. ...................................... 261/159; 165/60; 165/DIG. 1; 261/109; 261/DIG. 11; 261/DIG. 77
[58] Field of Search ........ 261/109, 154, 152, 159–161, 261/DIG. 11, DIG. 77; 55/257 PV; 165/DIG. 1, 60

[56] References Cited

U.S. PATENT DOCUMENTS

| 2,016,086 | 10/1935 | Fisher | 261/79 A |
|---|---|---|---|
| 2,859,831 | 11/1958 | Solnick et al. | 261/DIG. 11 |
| 3,065,587 | 11/1962 | Fordyce et al. | 55/257 PV X |
| 3,385,197 | 5/1968 | Greber | 261/DIG. 77 |
| 3,523,681 | 8/1970 | Jaye | 261/154 X |
| 3,846,519 | 11/1974 | Spangemacher | 261/DIG. 77 |
| 4,215,079 | 7/1980 | Christopherson et al. | 261/DIG. 11 |

FOREIGN PATENT DOCUMENTS

| 17517 | 10/1980 | European Pat. Off. | 261/DIG. 77 |
|---|---|---|---|
| 20191 | 12/1980 | European Pat. Off. | 261/DIG. 77 |
| 546519 | 4/1932 | Fed. Rep. of Germany | 55/257 PV |
| 2461982 | 10/1975 | Fed. Rep. of Germany | 165/DIG. 1 |
| 2234540 | 1/1975 | France | 261/DIG. 77 |
| 52-59352 | 5/1977 | Japan | 261/DIG. 77 |

*Primary Examiner*—Richard L. Chiesa
*Attorney, Agent, or Firm*—Kerkam, Stowell, Kondracki & Clarke

[57] ABSTRACT

Device for mixing dry and humid air streams of a combined atmospheric cooler employing parallel air streams. The device comprises a wet exchange unit and a dry heat exchange unit which are disposed in parallel in the air stream. The device for mixing the dry and humid air streams comprises surfaces for deflecting the air streams disposed upstream of the wet heat exchange unit and is characterized in that the deflecting surfaces are constituted by at least one channel which is open in the direction of the air outlet of the cooler and which extends in the space located upstream of the wet heat exchange unit. The at least one channel extends from the region in which the humid air stream arrives adjacent the part of the dry heat exchange unit which is the nearest of said region and toward the center of the cooler.

9 Claims, 9 Drawing Figures

AIR CHANNELING DEVICE FOR MIXING DRY AND HUMID AIR STREAMS OF A COMBINED WET AND DRY ATMOSPHERIC COOLER

This application is a continuation of application Ser. No. 133,669, filed Apr. 25, 1980, and now abandoned.

DESCRIPTION

FIELD OF THE INVENTION

The present invention relates to installations for placing a liquid in contact with a gas and more particularly to combined atmospheric coolers or cooling towers in which a liquid to be cooled, for example water, is placed in direct contact in one heat exchange unit and in indirect contact in another heat exchange unit with a cooling gas, for example, air of the atmosphere.

BACKGROUND OF THE INVENTION

Combined wet and dry coolers usually comprise one or more openings constituting a first air inlet and a wet heat exchange unit in which the air from the first inlet is placed in direct contact with the liquid to be cooled and a dry heat exchanger unit whose exchange elements may be disposed vertically at the periphery of the tower adjacent one or more openings constituting a second air inlet in parallel with the first. In the dry heat exchange unit the air is not in direct contact with the liquid, the latter flowing in heat exchange elements, for example, finned tubes or smooth tubes of metal or synthetic material. These coolers may employ a natural draught or a forced draught produced by suction or blower fans.

Such combined coolers are designed to avoid at the air outlet of the installation the formation of clouds which usually occurs at the air outlet of conventional wet coolers. In the past avoidance of air outlet clouds has only been partly achieved and there often remain cloudy streams which result from an insufficient mixture of the hot and humid air, which issues from the wet exchanger and flows at the centre of the tower, with the hot dry air which issues from the dry heat exchanger.

To overcome this problem of the mixture of the two air streams, it is known to dispose inside the cooling tower deflecting surfaces which produce turbulence in the dry air current and direct it toward the centre of the tower.

In some arrangements, these deflecting surfaces are formed by curved guide vanes which engage the humid air current and impart a giratory motion to the dry air to improve mixing of the two air streams.

It is also known in the prior art to provide a cooling tower at the base of which the gas stream which enters the installation passes through at least one heat exchange device, and at least one deflector disposed in the tower above the heat exchange device and adapted to direct at least a part of the gas stream toward the periphery of the tower.

SUMMARY OF THE INVENTION

An object of this invention is to provide improved means for mixing dry and humid air streams of combined atmospheric coolers employing parallel air streams.

According to the invention, there is provided a device for mixing dry and humid air streams of a combined atmospheric cooler employing parallel air streams, comprising a wet heat exchange unit and a dry heat exchange unit disposed in parallel in the air streams, characterized in that deflecting surfaces are formed by at least one channel which is open in the direction of the air outlet of the cooler. The channels extend from the region in which the humid air stream arrives, adjacent the part of the dry exchange unit which is the nearest to said region, toward the centre of the cooler.

BRIEF DESCRIPTION OF THE DRAWINGS

Further features of the invention will be apparent from the ensuing description with references to the accompanying drawings which are given solely by way of example and in which.

DETAILED DESCRIPTION OF THE INVENTION

Figure 1:
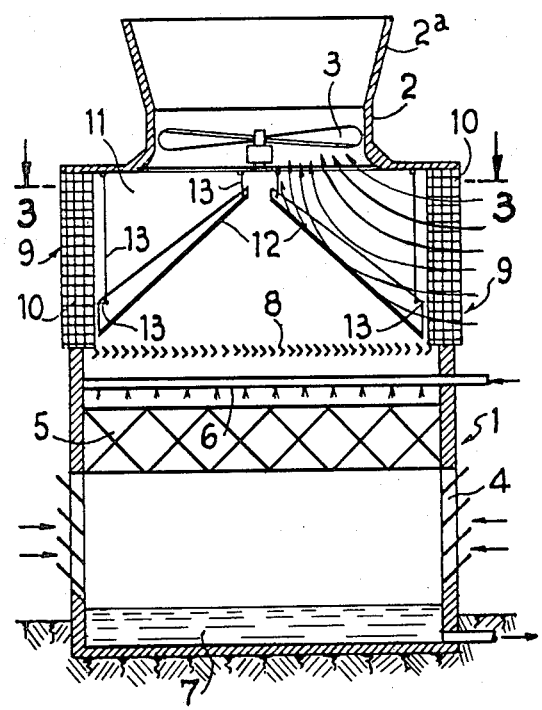
FIG. 1 is an elevational and sectional view of a cooler unit having a suction fan to which the invention is applied.

In FIG. 1, the invention is considered as being applied to a cooler unit having a suction fan.

The installation of FIG. 1 comprises a tower 1 which terminates in its upper part in a sleeve 2 and a diffuser 2a. A suction fan 3 is mounted in the circular orifice of the sleeve 2.

The tower 1 has at its base lower peripheral openings 4 forming an air inlet for a wet heat exchange unit 5. This wet heat exchange unit is of the type in which the air of the atmosphere, which enters the openings 4, is in direct contact with the water from a distribution system 6. This wet heat exchange unit or contacting unit 5, which extends throughout, or substantially throughout, the inner section of the tower is of the so-called counter-current type, that is to say the type in which the air stream travels in an upward direction opposed to the downward movement of the water.

The water supplied by the distribution system 6 is received in a basin 7.

Disposed above the distribution system 6 is a droplet separator 8 formed, for example, by panels of parallel corrugated sheets, the crests of the corrugations being horizontal and defining therebetween a sinuous path along which there is removed from the rising air stream a part of the droplets that it contains in suspension after it has been put in contact with the water.

Above the wet heat exchange unit 5, the tower comprises upper peripheral openings 9 forming air inlets for a pair of dry heat exchange units 10. The part of the tower 1 provided with the openings 9 constitutes a chamber 11 for mixing the humid and dry air streams coming respectively from the wet heat exchange unit 5 and the dry heat exchange unit 10. Disposed in the chamber 11 are air channeling members 12 which extend upwardly from the periphery of the chamber toward the centre of the chamber.

Figure 2:
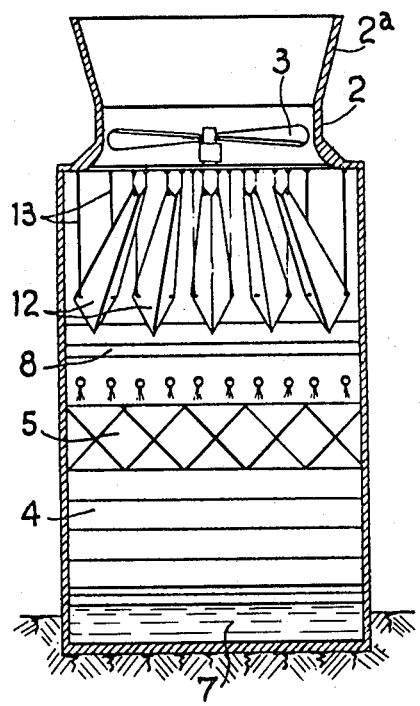
FIG. 2 is a side sectional view of the unit shown in FIG. 1.
Figure 3:
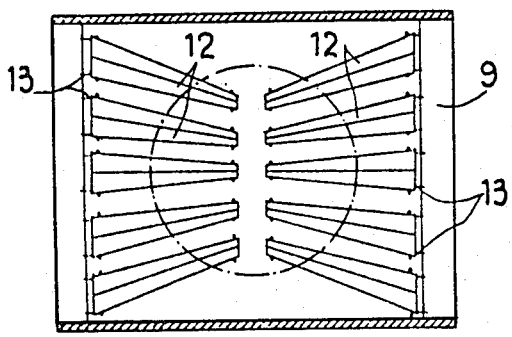
FIG. 3 is a sectional view taken on line 3—3 of FIG. 1.

In the embodiment shown in FIGS. 1 to 3, the channels 12, formed of a pair of elements, formed in a V-shaped section or configuration which has a constant angle and a pointed bottom, the height of the elements decreasing in a direction from the periphery of the cooler toward the interior thereof.

The cooler described with reference to FIGS. 1 and 3 has a rectangular section so that the channels 12 are disposed in such manner as to converge below the circular orifice of the sleeve 2 of the suction fan 3 (FIG. 3). With convergent channels such as those of the presently described embodiment of a cooler according to the invention, obstruction of the centre of the cooler by an excessive density of channels should be avoided. This is achieved in the presently described embodiment by the fact that the channels 12 are formed of elements which decrease in width in the direction of the centre of the cooler.

If the channels have a constant width, it may be necessary to provide, among the channels which lead to the centre region of the cooler, certain channels of shorter length, for example every other channel, whereas the peripheral ends of all of the channels being in alignment at the periphery of the tower.

When the cooler has a circular section, the channels are preferably disposed radially.

In the presently described embodiment, the channels 12 are maintained in position by guys 13.

The material of construction of the channels is preferably light in weight and resistant to corrosion due to the hot and humid air. Asbestos-cement, aluminum, galvanized steel, wood, or plastic are suitable for the construction of such channels.

The bottom of the channels does not have to be airtight. The V-section channels, formed by planar plates or elements may have a gap therebetween. The gap permits water which might condense or fall into the channel to flow in the lower section and the entry of humid air coming from the wet heat exchanger—which improves the mixture, provided that it occurs to a limited extent and avoids hindering the flow of the dry air stream.

In the embodiment just described, the channels are rectilinear and have a decreasing V-shaped section.

However, it is possible to envisage the use of U-shaped sections with a rounded bottom or other cross-sectional shapes. Moreover, the channels may also be curved, in which case the ends thereof facing the inlet openings 9 would be horizontal and would have a relatively slight slope, whereas the ends thereof communicating with the centre part of the cooler would have an inclination in the neighborhood of vertical.

Moreover, each channel may have a constant section throughout the length thereof, which renders it particularly easy and inexpensive to make.

The device just described operates in the following manner:

The channels 12 which extend upwardly from the periphery of the chamber 11 toward the centre of the latter constitute an obstacle for the rising air stream from the wet heat exchange unit 5, which obstacle creates a passageway for entry of the air issuing from the dry heat exchange device 10.

The air which issues from the dry heat exchange unit 10 in the region of a channel 12 travels along the latter without being disturbed by the air issuing from the wet heat exchange unit 5, whereas, in the absence of such channels, it would be urged back to the periphery of the cooler by the humid air.

As the width of the channels 12 decreases in the direction away from the dry heat exchange unit, there is a decrease in the flow of dry air conveyed by each of these channels. This decrease in the dry air flow of each channel 12 corresponds to an emission of dry air throughout the length of the channel toward the outlet end of the cooler, which effectively contributes to the good mixing of the dry and humid air streams.

The pressure drop due to the channels 12 is very low since the bottoms of the channels are profiled so as to deviate the humid air stream without creation of whirling and disturbances which cause high pressure drop and the divergent part of each channel 12 does not produce a sudden widening of the section available for the humid air stream which would also produce high pressure drop.

It will, however, be noted that on the downstream side of the longitudinal edges of the channels 12, there is a zone of the slight whirling which promotes mixing of the dry and humid air streams.

As the dry air is guided in its travel toward the centre of the tower, the humid air stream is not urged so much toward the centre but is directed more toward the periphery of the tower in the regions devoid of channels 12.

Figure 4:
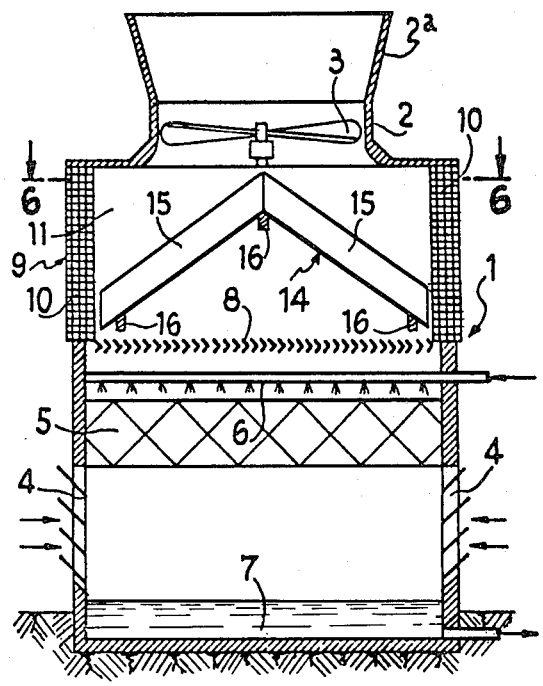
FIG. 4 is an elevational and sectional view of a cooler unit similar to that of FIGS. 1 to 3.
Figure 5:
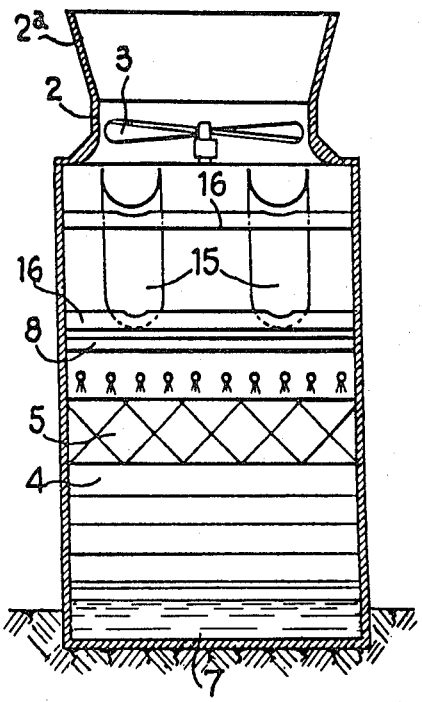
FIG. 5 is a side sectional view of the unit shown in FIG. 4.
Figure 6:
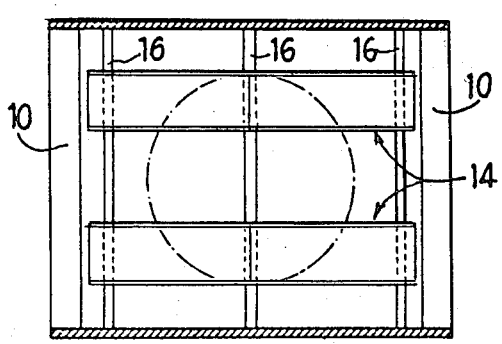
FIG. 6 is a sectional view taken on line 6—6 of FIG. 4.

The cooler shown in FIGS. 4 to 6 differs from that of FIGS. 1 to 3 in that the device for mixing the dry and humid air streams is formed by two channels 14 arranged in the form of a chevron, each channel being formed by two branches 15 which meet in the centre part of the chamber 11 located above the wet heat exchanger device 5. The channels 14 join the two air inlets 9 of the dry heat exchange units 10 below the suction orifice of the fan 3.

In the presently described embodiment, the channels 14 have a uniform section and their two branches 15 meet at a sufficient distance below the suction orifice of the fan 3 to avoid disturbing the operation of the fan and provide sufficient access to the humid air.

As can be seen in FIG. 5, the channels 14 have a semi-circular cross-sectional shape and are supported by bars 16 secured to the cooler.

The device shown in FIGS. 4 to 6 operates in a similar manner to the device shown in FIG. 3.

Figure 7:
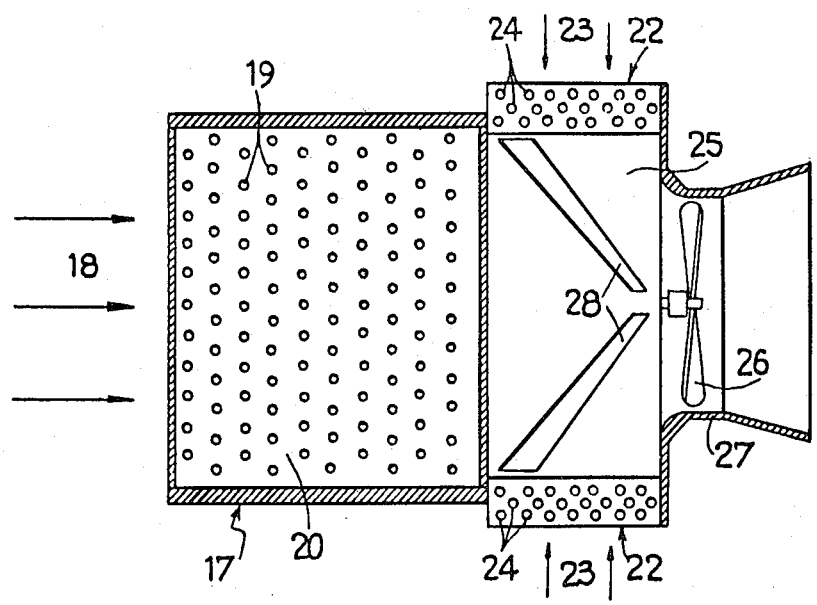
FIG. 7 is a plan sectional view of another embodiment of a cooler unit to which the invention is applied.
Figure 8:
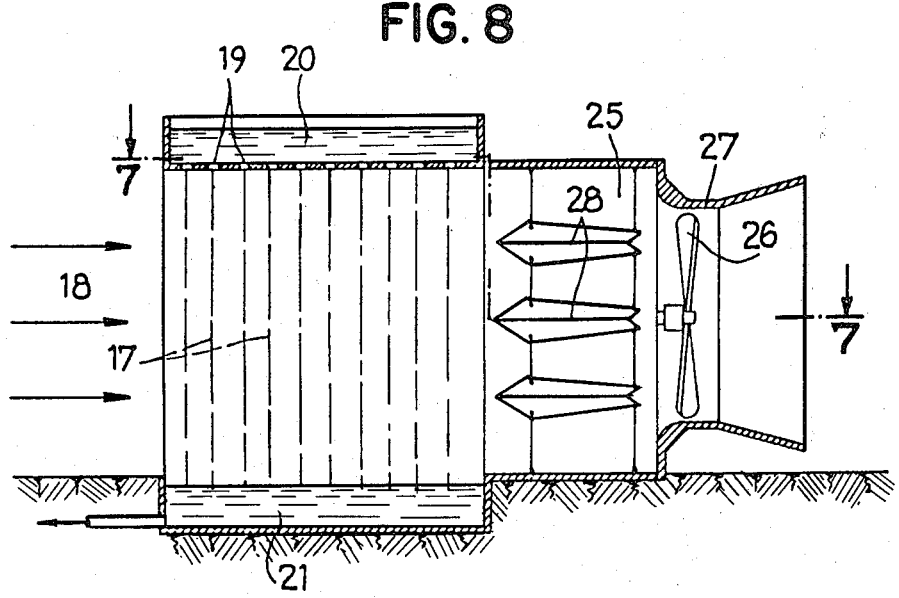
FIG. 8 is a side sectional view of the unit shown in FIG. 7.

The cooler shown in FIGS. 7 and 8 is a cooler employing horizontal air flow.

It comprises a cross-current wet heat exchanger 17 including an air inlet 18 and a water distribution system formed by spray nozzles 19 which are supplied with water, for example, by an open reservoir 20. The streaming water is received in basin 21.

Placed at the outlet of the wet heat exchange unit 17 are the dry heat exchange units 22 which units 22 include air inlets 23 which are perpendicular to the air inlet 18 of the wet heat exchange unit 17 which is, for example, formed by two heat exchangers each of which is formed by a set of vertical smooth tubes 24 made of plastics material.

The dry heat exchange unit 22 defines with the wet heat exchange unit 17 the chamber 25 for mixing the dry and humid air streams.

The cooler further comprises a suction fan 26 for drawing the air mixture out of the chamber 25. The fan 26 is mounted in a sleeve 27 which defines the suction orifice of the fan.

Disposed in the mixing chamber 25 are the channels 28 which are placed horizontally and converge toward the axis of symmetry of the cooler in the direction of the fan 26.

As can be seen in FIG. 8, the channels 28 are disposed in the mixing chamber 25 in such manner that their openings face the suction orifice of the cooler.

FIG. 8 also shows that the channels 28 are arranged in groups of channels which are parallel and are in superimposed relation.

In the presently described embodiment, the channels 28 are rectilinear and have a decreasing cross-section.

It will be understood that all the modifications of shape envisaged for the channels of the coolers described with reference to FIGS. 1 to 6 may also be adopted for the cooler of FIGS. 7 and 8.

If curved channels are used, the ends of the latter in the vicinity of the air inlets 23 of the dry heat exchange unit 22 must be parallel, or slightly inclined, to the direction of the air issuing from this unit, whereas their opposite ends must be parallel, or slightly inclined, to the general direction in which the air issues from the cooler.

Figure 9:
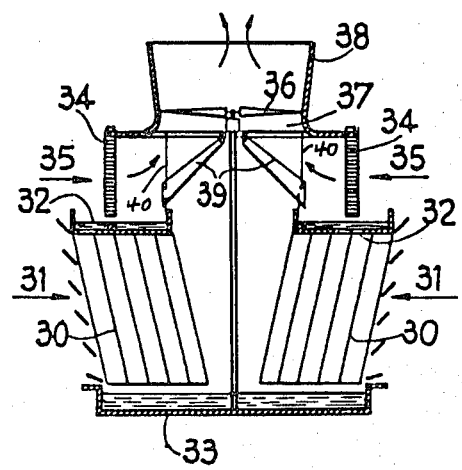
FIG. 9 is an elevational sectional view of a cross-current cooler to which the invention is applied.

The cooler shown in FIG. 9 comprises cross-current wet heat exchange units 30 including air inlets 31, reservoirs 32 for supplying water to the heat exchange units 30 and a basin 33 for receiving the water. Disposed above the reservoirs 32 for the water, are dry heat exchange units 34 having air inlets 35 and a suction fan 36 is placed in a sleeve 37 surmounted by a diffuser 38 above the dry exchange units 34.

Disposed in the space defined by the wet heat exchange units 30 and the dry heat exchange units 34 are channels 39 which deflect the dry air streams and are held in position by guys 40.

In contrast to the units shown in FIGS. 1 to 6, in which the peripheral ends of the channels are disposed in the immediate vicinity of the dry heat exchange units, the channels 39 have their peripheral ends placed immediately above the lower edges of the reservoirs 32 containing the water for the wet heat exchange units.

STATEMENT OF INDUSTRIAL APPLICATION

Wet and dry air streams from a combined wet and dry atmospheric cooler are mixed to reduce the tendency for cloud formation when the air streams issue from the cooler outlet.

I claim:

1. A device for mixing dry and humid air streams of a combined atmospheric cooler employing parallel air streams: comprising a wet heat exchange unit and a dry heat exchange unit disposed in parallel in the air streams, the device for mixing the dry and humid air streams comprising; air inlet means for the wet heat exchange unit, air inlet means for the dry heat exchange unit, common air outlet means for both the wet and dry heat exchange units, air stream deflecting surfaces, said deflecting surfaces formed by a plurality of spaced apart channel forming members which are open in the direction of the air outlet means of the cooler, said spaced channel forming members defining alternate gas passages for the humid and the dry air streams, said channel forming members extending in the space located between the wet heat exchange unit and the dry heat exchange unit, said channel forming members further extending on a converging slope from the region in which the dry air stream exits from the dry exchange unit which is the nearest to said wet heat exchange unit and then toward the centre of the cooler and wherein said channel forming members have V- or u-shapes in cross-section.

2. A device as claimed in claim 1, wherein the channel forming members have a constant width cross-section throughout their length.

3. A device as claimed in claim 1, wherein the channel forming members have a cross-section width which decreases from the end thereof in the vicinity of the dry heat exchange unit to the end thereof in the vicinity of the centre zone of the cooler.

4. A device as claimed in claim 3, wherein the channels formed by said channel forming members are rectilinear.

5. A device as claimed in claim 1, wherein the channel forming members have V-shaped cross-sections and are formed by planar plates.

6. A device as claimed in claim 1, wherein said cooler has a rectangular cross-section, and said plural channel forming members are disposed either parallel to each other or as to converge in the center region of the cooler.

7. A device as claimed in claim 1, wherein some of said channel forming members have a reduced length, and the ends of all the channel forming members which face the dry heat exchange unit are in alignment adjacent the wet heat exchange unit.

8. A device as claimed in claim 1, wherein the channels formed by said channel forming members are rectilinear.

9. A device as claimed in claim 1, wherein said cooler comprises cross-current wet heat exchanger units and the peripheral ends of said channel forming members are placed in the vicinity of the inner edges of said wet heat exchange units.

* * * * *